Nov. 13, 1951     T. P. DUNCAN, JR     2,575,050
POUND FISHING SYSTEM

Filed Oct. 7, 1947     2 SHEETS—SHEET 1

INVENTOR.
*Thomas P. Duncan, Jr*
BY
*Wilfred E. Lawson*
Attorney

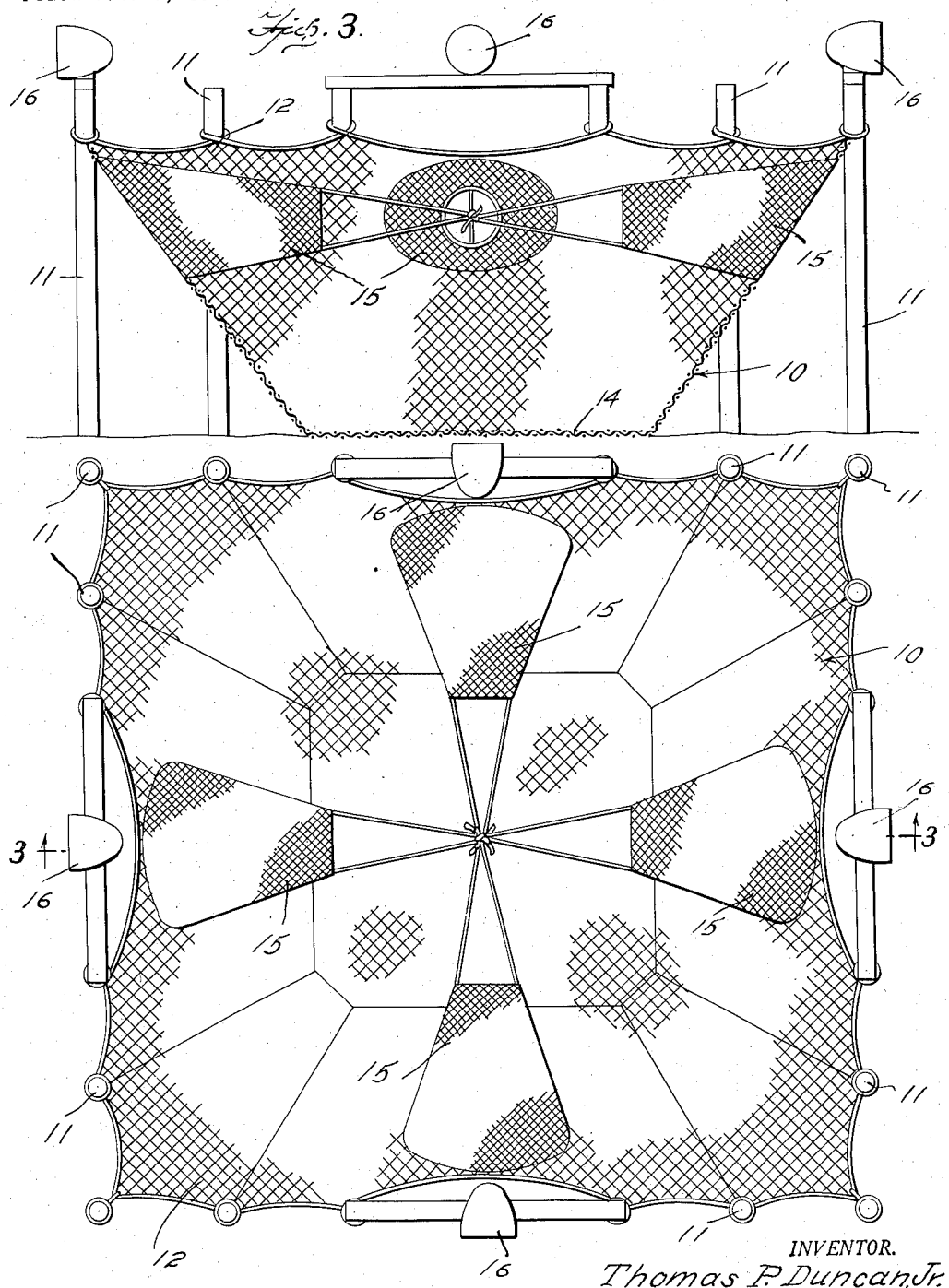

Patented Nov. 13, 1951

2,575,050

UNITED STATES PATENT OFFICE 2,575,050

POUND FISHING SYSTEM

Thomas P. Duncan, Jr., Newport News, Va.

Application October 7, 1947, Serial No. 778,388

3 Claims. (Cl. 43—101)

This invention relates to a pound fishing system.

It is an object of this invention to provide an improved fishing system having a central pound or enclosed net with entrance openings on opposite sides thereof through which the fish may enter, and having outwardly extending nets for guiding the fish toward the pound or central enclosed net.

Another object of this invention is to provide a pound fishing system of the kind to be more particularly described hereinafter having lights supported above the entrance cones of the central net for luring the fish between the outermost nets and in toward the entrance to the central net or pound.

Another object of this invention is to provide a fishing system of this kind having a landside net in alignment with an opening between a pair of the extended nets and in alignment with an entrance opening to the central net for directing the fish on the landside of the net toward an entrance.

A further object of this invention is to provide a device of this kind having lights for directing and luring the fish into the central net and a generator or central lighting system for the lights supported in a buoyant body having a fish bait or chum dispenser therein.

With the above and other objects in view, my invention consists in the arrangement, combination and details of construction disclosed in the drawings and specification, and then more particularly pointed out in the appended claims.

Figure 2 is a top plan view on an enlarged scale of the rectangular net structure and parts therein.

Figure 3 is a view in transverse section taken substantially on the line 3—3 of Figure 2, the conical entrance elements being in elevation.

Figure 1:
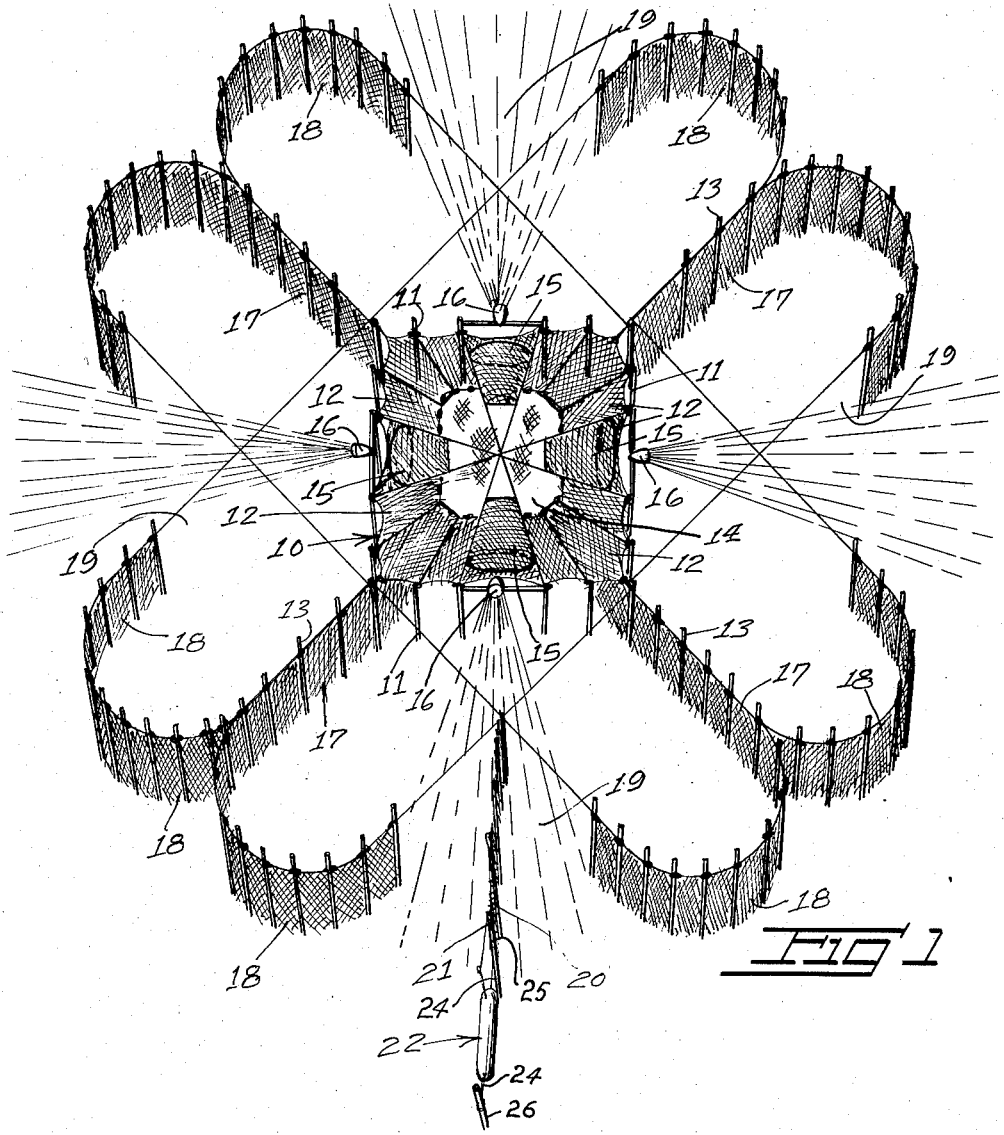
Figure 1 is a view in perspective and of a diagrammatic nature illustrating a pound fishing system in accordance with an embodiment of the invention.

Referring to the drawings, the numeral 10 designates generally a central net or pound supported by a plurality of posts 11 which penetrate the ground below the surface of the water for supporting the net therefrom.

The poles 11 are arranged in substantially rectangular disposition for supporting the rectangular net 10 thereon. The net 10 is formed with downwardly inclined outer or peripheral net walls 12 which are secured at their upper ends to the poles 11.

A floor net 14 is provided for engagement with the lower end of the downwardly inclined net walls 12 for closing the net 10 at the bottom thereof. Entrance net cones 15 are provided intermediate the length of each of the side nets 12 and are disposed along the vertical length thereof.

The conical nets 15 are open at the two ends thereof and each opens at its larger end through a net wall 12 and extends inwardly, the smaller inner end opening into the area enclosed by the walls 12. A light 16 is supported above the water level along the length of each of the side net walls 12 for luring the fish into the net 10. The lights 16 are of the beam type and are provided for casting a beam along the surface of the water substantially radially of the net 10, being in alignment with the center thereof.

The lights 16 are located directly over each of the conical nets or entrance cones 15. A radially extending line of poles 13 is arranged from the corners of the net 10 extending outwardly therefrom. A radially extending net 17 is supported by the poles 13 outwardly of the net 10 and a pair of arcuate bowed nets 18 are connected to the extreme outer end of the net 17 forming a pair of reversely curved nets spaced outwardly from the central net or pound 10.

The nets 18 are supported by poles 13 suitably arranged for securing the nets in the desired position. As shown in the drawings, the arcuate nets 18 and adjacent radially extending nets 17 terminate in spaced relation and the ends of the arcuate nets are directed in convergent relation toward the nearest cones 15.

The space 19 between the ends of adjacent arcuate nets 18 being in alignment with the entrance cone 15 of a side of the net or pound 10 provides an outer entrance for the fishing net arrangement.

When the fish have been lured by the light 16 toward the pound 10 they will first be lured through the opening 19 between the nets 17 and 18 on opposite corners of the pound. The fish then will be urged by the converging net walls 17 toward the walls 12 and will find their way into the pound area enclosed by the wall 12 through the inwardly tapering cones 15.

For leading the fish on the landside of the pound 10 toward an entrance opening of the central net, there is provided a landside net 20 secured on poles or rod 21 extending radially from the center of the pound 10 toward the land and shallow water.

The landside net 20 is disposed in a straight line and extends through an opening 19 between a pair of arcuate nets 18 on one side of the pound. A generator for the lighting system is supported in a buoyant body 22 which is particularly illustrated and described in my co-pending application Serial No. 778,387, filed October 7, 1947, which buoyant body is fastened by flexible lines 24 to a pair of poles 25 and 26 in aligement with the landside net 20. The pole 25 may form a part of the supporting means for the landside net.

With a net arrangement or pound fishing system of the kind described above, the fish are lured toward a central pound or net 10 by the rays of the lights 16 striking the water radially of the net 10 in alignment with the central net openings 15 and with the opening or passage 19 between a pair of arcuate nets 18.

The lights 16 are disposed on all four sides of the central net or pound 10 above a conical entrance opening or trap 15 on each side of the pound. The fish are initially lured in through the passage 19. Because of the fact that the cones 15 are substantially restricted in area, certain of the fish may turn around to flee from the trap and normally will leave the rays of light at an angle, and they will thus be directed into the confines of the nets 17 and 18 which extend radially outward from the corners of the net 10 and are shaped as a hook for leading the fish back towards the entrance opening 15 of the central net.

I do not mean to confine myself to the exact details of construction herein disclosed but claim all variations falling within the purview of the appended claims.

Having thus described my invention, what I claim is:

1. A pound fishing system comprising a hanging net enclosing a trap area, a frusto-conical entrance trap opening through the net between the top and bottom edges thereof, outwardly extending nets on said corner of said first mentioned net substantially radial to the center thereof, oppositely disposed segmental arcuate nets on the end of each of said radial nets, the space between certain of the adjacent arcuate nets being substantially radially aligned with said entrance cones, and a light carried by said first mentioned net above each of said entrance cones for attracting fish between said last referred to arcuate nets into the entrance cones.

2. A pound fishing system comprising a hanging net enclosing a trap area, a frusto-conical entrance trap opening through each of a number of sides of said net intermediate the height thereof, outwardly extending nets on each of a number of corners of said net substantially radial to the center thereof, oppositely disposed segmental arcuate nets on the outer end of each of said radial nets, the space between certain of the adjacent arcuate nets being substantially radially aligned with said entrance cones, a light carried by said first mentioned net above each of said entrance cones for attracting fish between said last referred to arcuate nets into the entrance cones, and a landside net extending inwardly between and beyond the spaced apart ends of a pair of said arcuate nets.

3. A pound fishing system of the character described comprising a plurality of rows of stakes arranged to define an area of polygonal outline having a plurality of corners, a hanging net suspended from said stakes to form a completely enclosed area and providing a plurality of walls, each wall paralleling a row of stakes, a plurality of frusto-conical net cones open at both ends, each of said walls having one of said cones attached thereto, the said cone being attached to said wall at its larger end and opening through the wall, each of said cones extending inwardly from the attached wall toward the center of the area, a bottom net connected with the bottom edge of the first mentioned net, a plurality of long nets each extending outwardly from a corner of the area defined by said rows of stakes, two substantially semi-circular nets at the outer end of each of said long nets, each two semi-circular nets having two joined ends connected with the outer end of the adjacent long net, the outer ends of each two semi-circular nets being extended inwardly toward a row of said stakes and spaced from a corresponding end of an adjacent semi-circular net to form an entrance passageway leading toward the larger end of one of said frusto-conical net cones, and an illuminating means disposed directly above the said larger end of each of the frusto-conical net cones and directed outwardly through a passageway between two semi-circular nets.

THOMAS P. DUNCAN, Jr.

REFERENCES CITED

The following references are of record in the file of this patent:

UNITED STATES PATENTS

| Number | Name | Date |
|---|---|---|
| 34,887 | Goodwin | Apr. 8, 1862 |
| 137,930 | Ketcham | Apr. 15, 1873 |
| 455,758 | Moulsong | July 14, 1891 |
| 1,489,917 | Blecker | Apr. 8, 1924 |
| 1,684,564 | Toppe | Sept. 18, 1928 |